US 6,842,547 B2
(12) United States Patent
Bülow

(10) Patent No.: US 6,842,547 B2
(45) Date of Patent: Jan. 11, 2005

(54) ADAPTIVE CHROMATIC DISPERSION COMPENSATOR

(75) Inventor: Henning Bülow, Kornwestheim (DE)

(73) Assignee: Alcatel, Paris (FR)

( * ) Notice: Subject to any disclaimer, the term of this patent is extended or adjusted under 35 U.S.C. 154(b) by 4 days.

(21) Appl. No.: 10/626,597

(22) Filed: Jul. 25, 2003

(65) Prior Publication Data

US 2004/0151509 A1 Aug. 5, 2004

(30) Foreign Application Priority Data

Aug. 6, 2002 (EP) .............................. 02360234

(51) Int. Cl.$^7$ .............................. G02B 6/12; H04J 14/02
(52) U.S. Cl. .................. 385/14; 385/2; 385/3; 385/40; 385/41; 398/81; 398/82
(58) Field of Search .............................. 385/1, 2, 3, 14, 385/39, 40, 41; 398/81, 82

(56) References Cited

U.S. PATENT DOCUMENTS

| 4,588,255 | A | * | 5/1986 | Tur et al. ...................... 385/24 |
| 4,768,850 | A | * | 9/1988 | Moslehi et al. ................ 385/24 |
| 5,526,439 | A | * | 6/1996 | Bergmann .................... 385/24 |
| 6,400,870 | B1 | * | 6/2002 | Hill et al. ...................... 385/39 |
| 6,687,461 | B1 | * | 2/2004 | MacFarlane et al. .......... 398/82 |
| 2001/0021940 | A1 | * | 9/2001 | Fujii et al. ................... 708/318 |
| 2003/0103723 | A1 | * | 6/2003 | Bohn et al. .................... 385/27 |
| 2003/0179972 | A1 | * | 9/2003 | Gerlach et al. ................. 385/1 |

FOREIGN PATENT DOCUMENTS

EP    0 997 751 A2    5/2000

OTHER PUBLICATIONS

OFC 2002, Optical Fiber Communication Conference and Exhibit, Mar. 17–22, 2002, Anaheim, California, Technical Digest.
Koichi Takiguchi, "Planar Lightwave Circuit Dispersion Equalizer", Journal of Lightwave Technology, vol. 14, No. 9, Sep. 1966, pp. 2003–2011.
USSN 10/715,557 filed Nov. 19, 2003.
Takiguchi K et al: "Dispersion Slope Equalizer for Dispersion Shifted Fiber Using a Lattice–Form Programmable Optical Filter on a Planar Lightwave Circuit" Journal of Lightwave Technology, IEEE. New York, US, vol. 16, No. 9, Sep. 1, 1998, pp. 1647–1656, XP000786638.
Patent Abstracts of Japan vol. 018, No. 106 (P–1697), Feb. 21, 1994 & JP 05 303019 A (Nippon Telegr & Teleph Corp), Nov. 16, 1993.

* cited by examiner

Primary Examiner—Brian M. Healy
(74) Attorney, Agent, or Firm—Sughrue Mion, PLLC

(57) ABSTRACT

An integrated chromatic dispersion compensator for optical signals in optical communication networks, comprising a plurality of cascaded stages of optical dispersion elements arranged in the form of a lattice filter structure, is characterized by at least one tapping device disposed between consecutive stages of the optical dispersion elements for tapping inter stage signals, feeding each tapped inter stage signal into a separate feedback loop, which in turn is feeding adaptation parameters into at least one of the stages of the optical dispersion elements preceding the corresponding tapping device of the inter stage signal. The invention presents a compact dispersion compensator that can dynamically be adapted to varying dispersion situations and that is capable of compensating the chromatic dispersion of a multitude of data channels at the same time.

11 Claims, 2 Drawing Sheets

ADAPTIVE CHROMATIC DISPERSION COMPENSATOR

The invention is based on a priority application EP 02360234.5 which is hereby incorporated by reference.

BACKGROUND OF THE INVENTION

The invention relates to an integrated chromatic dispersion compensator for optical signals in optical communication networks, comprising a plurality of cascaded stages of optical dispersion elements arranged in the form of a lattice filter structure.

An integrated chromatic dispersion compensator of this type was described by K. Takiguchi, S. Kawanashi, H. Takara, A. Himeno and K. Hattori in J. Lightwave Technol. Vol. 16, No. 9, 1998, p. 1647–1656.

Optical communication networks have increased in importance since the transmission of large amounts of data over long distances, in particular via the internet, has become popular.

Digital data transfer via optical communication networks is based on electromagnetic waves of a center frequency on the order of 195 THz carrying a modulation which contains the data to be transmitted. The typical bandwidth of such a modulation is about 40 GHz in a 40 Gbit/s DWDM (wavelength division multiplex) system. The light waves are transferred through optical waveguides, such as glass fibers.

However, the effective refractive index of standard waveguide is frequency dependent due to material dispersion and waveguide dispersion. This means that high frequency parts and low frequency parts of the electromagnetic wave propagate through the waveguide at different speeds (group velocity). This effect is called chromatic dispersion and causes time separations between parts of the same data channel. In the example above, a transmission distance of 100 km causes a time separation of about 240 ps between the low frequency part and the high frequency part of the modulated electromagnetic wave. Since the length of one information bit is only about 25 ps, dispersion may damage the information contained in the data channel.

To overcome this problem, optical communication networks are equipped with dispersion compensators. These are intended to undo chromatic dispersion effects.

One type of dispersion compensator is based on chirped fiber Bragg grating (CFBG) as described in the Technical Digest of the Optical Fiber Communication Conference and Exhibit, Mar. 17–22, 2002, Anaheim, Calif., page 577ff; T. Sugihara et al., Paper ThAA2. The electromagnetic wave is sent into fiber with a refractive index grating written into the core region of the fiber. The grating period of the fiber decreases (or increases) along the fiber. The location of reflection (Bragg refection) of a specific frequency part of the wave is dependent on said grating period. Low frequency parts are reflected later (earlier), whereas high frequency parts are reflected earlier (later) and must propagate through the dead end fiber for a longer time. Through Peltier elements exploiting thermal expansion of the material between the mirror planes, CFBG compensators may be adapted to a specific dispersion situation. This involves the optimization of 1 or 2 temperature parameters. However, a CFBG compensator only works for one data channel. Therefore, dispersion compensation for a waveguide that normally transmits a multitude of data channels (typically 32 with a spacing of 100 GHz) requires the separation of these channels into separate fibers and one CFBG compensator component for each channel. This means very costly procedures and constructions, in particular requiring plenty of rag space in central offices due to the large dimensions of one CFBG compensator component.

A second type of dispersion compensator is constructed as an integrated optic dispersion compensator (equalizer) on a planar light wave circuit; see K. Takiguchi et al. It consists of cascaded Mach-Zehnder interferometers (MZI) in a lattice-form optical filter design. In general, an MZI consists of two 3 dB couplers connected via two waveguide arms, one containing a thermo-optic phase shifter and one containing a delay line. In general, the first coupler distributes incoming electromagnetic waves on the two waveguide arms, with the frequency spectrum in the two arms being different. The delay line causes a time delay for the part of the electromagnetic wave in the corresponding arm, whereas the phaseshifter determines the interference situation in the next coupler. Integrated optical dispersion compensators are in principle suitable for compensating the dispersion of a plurality of data channels at a time due to the repetition of the transfer characteristics with the optical frequency. However, in the state of the art there is no method available for adapting an integrated optical dispersion compensator to a varying degree of dispersion.

A dispersion compensator must be adapted to the amount of dispersion of the incoming electromagnetic wave, i.e. to the waveguide. The dispersion situation at the end of a waveguide of a length on the order of some 100 km is not stationary, but varies over time. The most important reason for such a variation is the temperature dependence of the refractive index of the waveguide material. In the above-mentioned example, a temperature change of 30° C. in an 800 km waveguide causes a time separation of about 50 ps/nm. Other problems arise when a dispersion compensator is to be used with different types of waveguides, in particular different lengths and materials. Then a fine tuning of the dispersion compensator in necessary at the installation, but usually cannot be accomplished with satisfactory accuracy for economic reasons.

Therefore, dispersion compensators not capable of dynamically adapting to varying dispersion situations can only accomplish a coarse compensation, with residual chromatic dispersion remaining uncompensated and increasing the bit error rate (BER) of the optical data transfer process.

OBJECT OF THE INVENTION

It is the object of the invention to present a compact dispersion compensator that can dynamically be adapted to varying dispersion situations and that is capable of compensating the chromatic dispersion of a multitude of data channels at the same time.

Short Description of the Invention

This object is achieved by an integrated optical dispersion compensator mentioned in the beginning characterized by at least one tapping device disposed between consecutive stages of the optical dispersion elements for tapping inter stage signals, feeding each tapped inter stage signal into a separate feedback loop, which in turn is feeding adaptation parameters into at least one of the stages of the optical dispersion elements preceding the corresponding tapping device of the inter stage signal.

In the invention, intermediate ("inter stage") optical signals are tapped out of the integrated chromatic dispersion compensator (ICDC) which are used for adaptation. Thus, it is not only the signal at the output port of the ICDC chip that can be used for compensation.

It is possible to use an inventive ICDC as the only dispersion compensating device for compensating the chromatic dispersion of a waveguide, but it can also be used as an additional device supporting a stationary dispersion compensator, eliminating the residual chromatic dispersion of said stationary dispersion compensator. For this reason, the ICDC can also be referred to as a residual chromatic dispersion compensator (RCDC).

The equipment to build up the feedback loops is inexpensive. The tapped signals are typically used to adjust one phase shifter only, with adjusting typically to the maximum of the optical power of the tapped signal. The optimisation of the phase of a phaseshifter controlled by a separate feedback loop can be accomplished by a simple dithering algorithm with low speed electronics and photodiodes.

In the most simple case, the stage being controlled by a feedback loop analysing the signals of a tapping device is the stage immediately preceding the tapping device. This avoids undesired correlations between different feedback loops. But it is also possible to control stages farther away from the tapping device, in particular if intermediate stages between the controlled stage and the tapping device operate stationary.

The complete construction of the ICDC is, in accordance with the invention, integrated on one chip and thus arranged as one single device. This allows an extremely simple handling and quick installation procedure.

In a preferred embodiment of the invention, the integrated chromatic dispersion compensator comprises a plurality of tapping devices disposed between several stages of the optical dispersion elements for tapping inter stage signals. This means that the number of parameters for the dispersion compensation increases, but, on the other hand, the increased number of fit parameters allows a more exact compensation of the prevailing dispersion.

When a plurality of stages is comprised in the ICDC, there is also a plurality of parameters (in particular phases of phase shifters) to be adjusted. This bears the risk of numerous local minima or maxima that cannot be handled by a simple adaptation control evaluating the output signal only. Moreover, the adaptation time grows exponentially with the number of parameters when adjusting is accomplished based merely on the output signal, so the adjusting process may become rather time consuming and complex. By adjusting each important parameter with its own feedback loop, it is excluded that the adjustment process of the ICDC is trapped in a local but not global minimum or maximum of one single global feedback loop that is adjusting all parameters at the same time. Realising the invention, the adjustment time is only linearly dependent on the number of parameters. In accordance with the invention, it is also possible to adjust groups of parameters with one feedback loop each, with generally a plurality of groups of parameters being adjusted independently.

In a highly preferred embodiment, the integrated chromatic dispersion compensator is characterized in that the stages of the of the optical dispersion elements comprise tuneable phaseshifters, in particular electrically and/or thermally tuneable phaseshifters. These phase shifters are simple means for controlling the interference of electromagnetic waves from two waveguide arms in a coupler following the phase shifter. This interference influences the partitioning of the frequency spectrum in the next coupler, and thus influences the dispersion compensation. In a typical design of the invention, phase shifters comprise the only dynamically adaptable components of the lattice filter structure; in particular, delay lines and couplers operate stationary.

In a further development of this embodiment, each feedback loop controls only one single phaseshifter, preferably a phaseshifter which is arranged in parallel to or in series with a delay element. Phaseshifters arranged in parallel or in series to delay lines (note that the effect of a phase shifter is identical in both cases) are of particular importance to the chromatic dispersion compensation, so preferably all phaseshifters arranged in parallel or in series to delay lines are controlled by a separate feedback loop. In controlling only one single phaseshifter, the feedback loop cannot get trapped in a local minimum or maximum that is not identical to the absolute (global) minimum or maximum of its feedback parameter.

An advantageous embodiment of the inventive integrated chromatic dispersion compensator is characterized by a further tapping device for tapping the output signal of the lattice filter structure, and feeding the tapped output signal in an additional feedback loop, and feeding adaptation parameters derived by the additional feedback loop into at least one of the stages of the optical dispersion elements preceding the further tapping device. This means, that apart from inter stage tapping devices, a further tapping device may be placed at the signal output of the ICDC, above all for controlling the stage immediately preceding the signal output of the ICDC, since this stage would else need to be operated stationary. Thus, an even better adaptation of the dispersion compensator to the prevailing dispersion can be obtained.

In a preferred embodiment of the integrated chromatic dispersion compensator, one or more of the cascaded stages of the optical dispersion elements comprise a Mach-Zehnder interferometer (MZI). The ICDC may be completely built from cascaded MZIs, but may also comprise less defined structures. MZIs are standard structures on planar light wave circuits easily available and producable in a standardized way.

The invention also comprises a method for operating an integrated chromatic dispersion compensator according to the embodiment comprising a further tapping device as described above, characterized in that the additional feedback loop is adjusted to maximize the average optical power of the output signal of the lattice filter structure. This is the most simple fitting routine for the additional feedback loop connected to the further tapping device. A high optical output power secures a high signal to noise ratio of the output signal.

In another method for operating an inventive integrated chromatic dispersion compensator, the adaptation parameters are chosen in order to either maximize or minimize the average optical power of the corresponding tapped interstage signal, or to set the tapped interstage signal to a pre-selected level. These are easy to handle fitting procedures sufficient to obtain the advantages of the invention.

A further method for operating an inventive integrated chromatic dispersion compensator is characterized in that two interstage signals between two consecutive stages of optical dispersion elements are tapped from different parallel waveguides of the lattice filter structure, that the difference of the average optical power of said two tapped interstage signals is either maximized or minimized, or set to a pre-selected level. This method allows an exact distribution of optical power between the two parallel waveguides of the lattice filter structure, in particular between two waveguide arms of a MZI. Thus, the time delay can be performed intentionally to a separated frequency part of an incoming signal.

A method in accordance with the invention is characterized in that the stages of the optical dispersion compensators not controlled by a feedback loop are controlled by an additional adaptation control device optimising a quality signal derived from the output signal. Typical quality signals comprise an electronic eye monitor (i.e. the vertical width of an eye diagram), the bit error rate, FEC error count (forward-error correction), the spectral line of the detected signal, as well as the center frequency, the bandwidth and the average optical power of the detected signal. Typically, the stages controlled by the additional adaptation control device are tuned in parallel to keep the adaptation procedure simple. Nevertheless, consecutive dithering of the control devices (i.e. phase shifters) can also be applied if a further reduction of the residual distortion is the major target. This parallel tuning generates the appropriate dispersion compensation. The tuning itself may be performed as a feedback dithering algorithm. Moreover, the stages controlled by the additional adaptation control device comprise a phaseshifter, but preferably do not comprise delay lines.

Another method for operating an inventive integrated chromatic dispersion compensator is characterized in that the stages of the optical dispersion elements not controlled by a feedback loop are controlled by an accessory control device, that a dispersion analyser determines the amount of dispersion of the input signal of the lattice filter structure, and that the data determined by the dispersion analyser is evaluated by the accessory control device for controlling the stages of the optical dispersion elements not controlled by a feedback loop. The tuning of the stages (typically the phaseshifters) not controlled by a feedback loop generates the actual dispersion compensation, e.g. on grounds of reading out a table. This feed-forward tuning procedure can do without a dithering algorithm and is thus very fast.

Further advantages can be extracted from the description and the enclosed drawings. The features mentioned above and below can be used in accordance with the invention either individually or collectively in any combination. The embodiments mentioned are not to be understood as exhaustive enumeration but rather have exemplary character for the description of the invention.

DRAWINGS

The invention is shown in the drawings.

In 40 Gb/s DWDM systems (and also 160 Gb/s systems) compensated by a DCF module (dispersion compensating fiber) some or all wavelength channels might experience penalty due to uncompensated residual chromatic dispersion which might arise due to Temperature change of the transmission fiber (waveguide) in long links;

Mismatch of transmission fiber dispersion slope and DCF dispersion slope;

An economic installation of the DCF might prohibit any fine tuning of the DCF to be installed.

Figure 1:
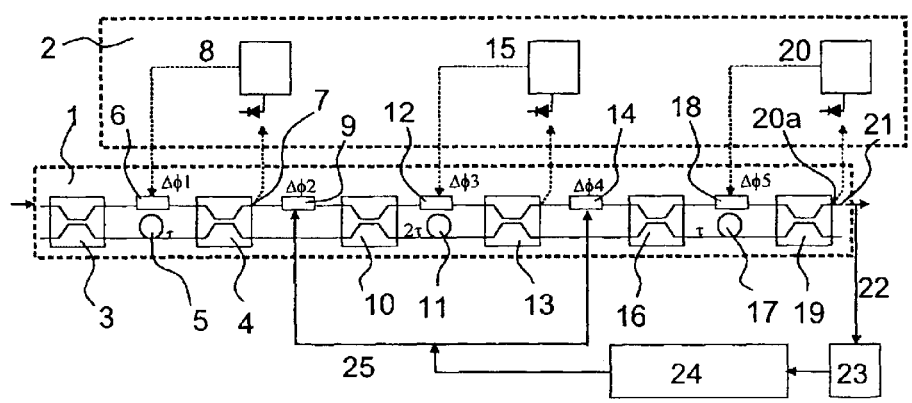
FIG. 1 shows a connection scheme of an integrated optic residual dispersion compensator with an additional adaptation control device for feed-back in accordance with the invention.

In all these cases the use of a dynamically adapting residual chromatic dispersion compensator (RCDC) is beneficial. Integrated optic circuits (e.g. Planar Lightwave Circuit: PLC) bear the potential of an economic realization for dispersion mitigation due to the possibility to realize many compensators on one chip. The application of a thermooptic tunable RCDC was demonstrated in the last years, see K. Takiguchi, K. Okamoto, K. Moriwaki; J. Lightwave Technol. Vol. 14, No. 9, 1996, p. 2003–2011. A typical cascaded Mach-Zehner interferometer structure is shown in FIG. 1, box with reference number 1.

These structures need to be adjusted to the actual dispersion and also to the frequency spectrum to be transmitted. Many parameters have to be adjusted simultaneously, e.g. electrically tunable phase shifters 6, 9, 12, 14, 18. This bears the danger of many relative optima which can hardly be handled by a simple adaptation control merely verifying the output signal.

In accordance with the invention, "intermediate" optical signals are tapped out of the RCDC chip and are used for adaptation, not only the signal at the output port of the chip. With these topped signals separate simple (low cost) feedback loops are formed to adjust only one phase shifter (here maximum adjustment of the average optical power is performed). Many local maxima are avoided. For the specific structure of an adaptive RCDC shown below we have:

Phaseshifters 6, 12, 18 are separately tuned to maximum average optical power, which can be accomplished by a simple dithering algorithm realized with low speed (i.e. inexpensive) electronics and photodiode.

Phaseshifters 9, 14 are tuned in parallel to generate the appropriate dispersion. This is done by observing the compensated signal at the output of the RCDC and maximizing its quality measured by a feedback signal. This can also be a dithering algorithm implemented in the adaptation control. The feedback signal can be electronic eye monitor, FEC error count, spectral line of detected signal etc. Most of the feedback signals already known from PMD (polarization mode dispersion) compensation might be applicable.

BRIEF DESCRIPTION OF THE PREFERRED EMBODIMENTS

The inventive integrated residual chromatic dispersion compensator shown in FIG. 1 comprises a cascaded Mach-Zehnder interferometer structure, enclosed in a box indicated with reference number 1. Mach-Zehnder interferometers for themselves are known from the state of the art.

The inventive ICDC further comprises a structure for phase locking on channel wavelengths, enclosed in a box indicated with reference number 2.

The Mach-Zehnder interferometer structure 1 is an example of a lattice filter structure. Lattice filter structures generally comprise two parallel waveguide lines, alternatingly interrupted by parallel optical devices in each waveguide line (e.g. phaseshifters or delay loops) and crossover locations where the two waveguide lines may undergo coupling effects.

In the example given in FIG. 1, the input signal is fed into the upper input port 3a of a first 3 dB coupler 3. The first 3 dB coupler 3 and a second 3 dB coupler 4, together with a delay line 5 of delay time τ and a phaseshifter 6 generating a phase shift of Δϕ1 form a Mach-Zehnder interferometer. One signal outlet of the second 3 dB coupler 4 (or the subsequent waveguide arm) is tapped with a tapping device 7, messaging signal characteristics into a feedback loop 8. Within the feedback loop 8, adaptation parameters are generated for the phaseshifter 6 in order to optimize the signal tapped by the tapping device 7.

Subsequent to the 3 dB coupler 4, a phaseshifter 9 is disposed in the upper waveguide arm. This phaseshifter 9 is not controlled by a feedback loop of the structure for phase locking 2.

In the example given, the middle part of the ICDC comprises further 3 dB couplers 10, 13, 16, a phaseshifter 12 parallel to a delay line 11 and controlled by a feedback loop 15, and a phaseshifter 14 not controlled by a feedback loop.

The last stage of the ICDC comprises a phaseshifter 18 parallel to a delay line 17 and a 3 dB coupler 19. The upper output 21 of the coupler 19 delivers the output signal of the lattice filter structure, i.e. of the ICDC. The upper output 21 is tapped with a further tapping device 20a to provide the additional feedback loop 20 with the necessary data to control the phaseshifter 18.

The upper output 21 is also tapped by a quality signal line 22 to provide a quality analyzer 23 with the necessary signal information. The results of the quality analysis is given to the additional adaptation control device 24 to generate control parameters for the phaseshifters 9 and 14. These operation parameters may be used for tuning the ICDC to the actual dispersion 25 of the input signal of the lattice filter structure. Preferably, the phaseshifters 9, 14 are tuned in parallel to keep the tuning the least complex as possible. A simple way of tuning 25 can be performed by dithering the operation parameters and analyze the effect on the quality parameter analyzed in the quality analyzer 23.

Figure 2:
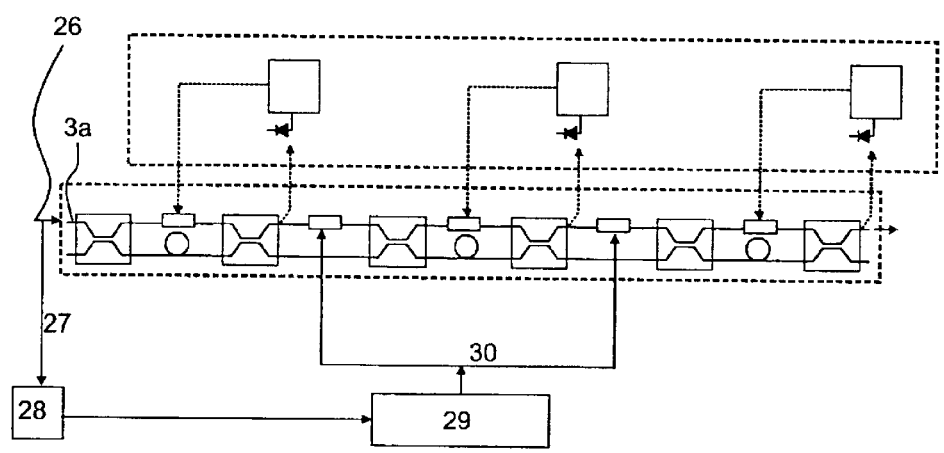
FIG. 2 shows a connection scheme of an integrated optic residual dispersion compensator with an accessory control device for feed-forward in accordance with the invention.

In FIG. 2, an alternative and inventive method for controlling the phaseshifters 9, 14 which are not controlled by feedback loops is illustrated. The input signal 26 of the lattice filter structure is tapped with line 27. The tapping position may also be located at the upper input port 3a. A dispersion analyzer 28 determines the amount of dispersion which has corrupted the input signal 26 and gives this information to the accessory control device 29. The accessory control device 29 gives parameters for tuning the actual dispersion 30 of the input signal 26 to the phaseshifters 9, 14. These parameters may be obtained by reading out a table stored in the accessory control device 29 which lists the most favorable values for the operation parameters of the phaseshifters 9, 14 in order to compensate the prevailing dispersion of the input signal 26. In the most simple case, the phaseshifters 9, 14 are tuned in parallel. Reading out a table in the accessory control device is much easier and faster than performing dithering algorithms as in the embodiment of FIG. 1.

What is claimed is:

1. Integrated chromatic dispersion compensator for optical signals in optical communication networks, comprising a plurality of cascaded stages of optical dispersion elements arranged in the form of a lattice filter structure, wherein
    at least one tapping device disposed between consecutive stages of the optical dispersion elements for tapping inter stage signals, feeding each tapped inter stage signal into a separate feedback loop, which in turn is feeding adaptation parameters into at least one of the stages of the optical dispersion elements preceding the corresponding tapping device of the inter stage signal.

2. Integrated chromatic dispersion compensator according to claim 1, wherein the integrated chromatic dispersion compensator comprises a plurality of tapping devices disposed between several stages of the optical dispersion elements for tapping inter stage signals.

3. Integrated chromatic dispersion compensator according to claim 1, wherein the stages of the optical dispersion elements comprises tuneable phaseshifters, in particular electrically and/or thermally tuneable phaseshifters.

4. Integrated chromatic dispersion compensator according to claim 3, wherein each feedback loop controls only one single phaseshifter, preferably a phaseshifter which is arranged in parallel to or in series with a delay element.

5. Integrated chromatic dispersion compensator according to claim 1, wherein a further tapping device for tapping the output signal of the lattice filter structure, and feeding the tapped output signal in an additional feedback loop, and feeding adaptation parameters derived by the additional feedback loop into at least one of the stages of the optical dispersion elements preceding the further tapping device.

6. Integrated chromatic dispersion compensator according to claim 1, wherein one or more of the cascaded stages of the optical dispersion elements comprise a Mach-Zehnder interferometer.

7. Method for operating an integrated chromatic dispersion compensator according to claim 5, wherein the additional feedback loop is adjusted to maximize the average optical power of the output signal of the lattice filter structure.

8. Method for operating an integrated chromatic dispersion compensator according to claim 1, wherein the adaptation parameters are chosen in order to either maximize or minimize the average optical power of the corresponding tapped interstage signal, or to set the tapped interstage signal to a pre-selected level.

9. Method for operating an integrated chromatic dispersion compensator according to claim 1, wherein two interstage signals between two consecutive stages of optical dispersion elements are tapped from different parallel waveguides of the lattice filter structure, that the difference of the average optical power of said two tapped interstage signals is either maximized or minimized, or set to a pre-selected level.

10. Method for operating an integrated chromatic dispersion compensator according to claim 1, wherein the stages of the optical dispersion elements not controlled by a feedback loop (8, 15) are controlled by an additional adaptation control device (24) optimizing a quality signal derived from the output signal of the lattice filter structure.

11. Method for operating an integrated chromatic dispersion compensator according to claim 1, wherein the stages of the optical dispersion elements not controlled by a feedback loop are controlled by an accessory control device, that a dispersion analyzer determines the amount of dispersion which has distorted the input signal of the lattice filter structure, and that the data determined by the dispersion analyzer is evaluated by the accessory control device for controlling the stages of the optical dispersion elements not controlled by a feedback loop.

* * * * *